UNITED STATES PATENT OFFICE.

CARL HINDERMAN, OF PHILADELPHIA, PENNSYLVANIA.

TURNBUCKLE.

1,305,359.     Specification of Letters Patent.     Patented June 3, 1919.

Application filed August 10, 1918. Serial No. 249,343.

*To all whom it may concern:*

Be it known that I, CARL HINDERMAN, a citizen of the United States, residing at 5400 Walnut street, Philadelphia, in the county of Philadelphia and State of Pennsylvania, have invented new and useful Improvements in Turnbuckles, of which the following is a specification.

The invention relates to turnbuckles, and has for an object to provide a turnbuckle in which parts thereof can be relatively locked to secure the turnbuckle against accidental movement.

The invention comprehends among other features, a device which although adaptable for various purposes, is particularly used in connection with aeroplane construction for securing in tension the usual stays and guy wires employed, and to this end the invention consists of a turnbuckle having a locking arrangement to prevent accidental rotation of the turnbuckle, and which rotation, if effected, would either increase the strain on the guy wires to a breaking point, or loosen the guy wires making the same useless for the purpose for which they are employed.

In the further disclosure of the invention, reference is to be had to the accompanying drawing, constituting a part of this specification, in which similar characters of reference denote corresponding parts in all the views, and in which—

Figure 1:
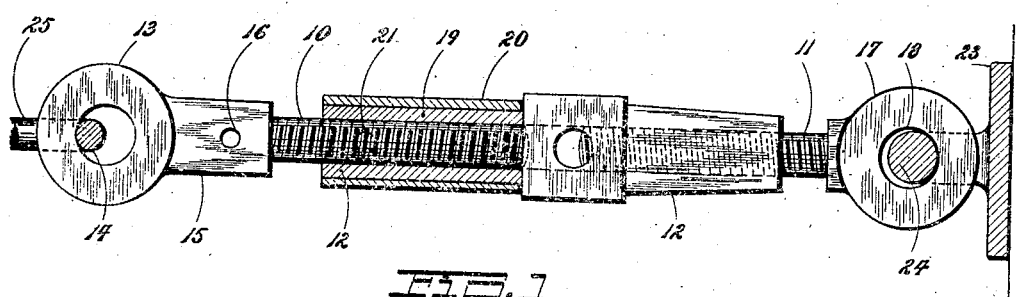
Figure 1 is a fragmentary side elevation of the turnbuckle showing the parts in unlocked relation, parts being broken away to disclose the underlying structure.

Referring more particularly to the views, the turnbuckle includes a plurality of screw rods 10, 11, adapted for threaded association with a tubular threaded connecting element 12, one of the screw rods 10 being threaded into one end of the element and the other screw rod into the opposite end. The screw rod 10 has a circular head 13 provided with an opening 14, which head terminates in a squared shank 15, having a transverse aperture 16. The screw rod 11 is provided with a similar head 17 having an opening 18 therein, and it will of course be understood that the mentioned heads and shanks are integral with the respective screw rods. The connecting element 12 has a portion thereof formed with a squared shank 19, and which portion receives the screw rod 10 therein, and mounted to slide on said squared shank 19, and entirely inclosing same, is a squared sleeve 20, which can be slid forwardly to pass over the squared shank 15, so that apertures 21 in the squared sleeve 20 will register with the aperture 16, to permit of passing a cotter pin or other securing wire 22 or the like, through the registering apertures, thus locking the head part of the screw rod 10 relative to the connecting element.

Figure 2:
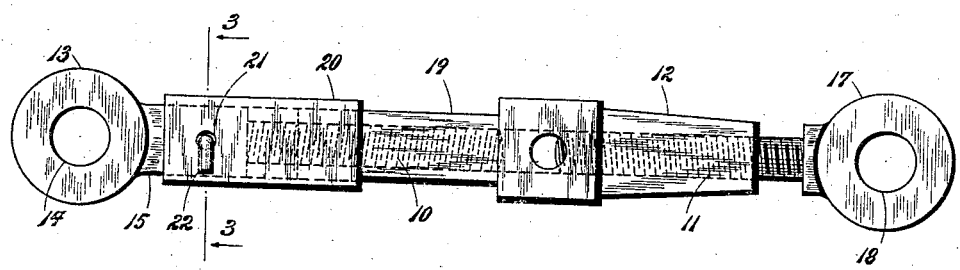
Fig. 2 is a side elevation, showing the parts in locked relation.
Figure 3:
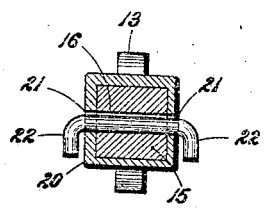
Fig. 3 is a vertical sectional view taken on the line 3—3 in Fig. 2.

In the use of my invention the head 17 is preferably secured to a suitable bracket 23, by having a strap 24 in the bracket passing through the opening 18, thus anchoring this end of the turnbuckle; and the head 13 is preferably arranged to have a suitable guy wire 25 pass through the opening 14 thereof, as shown. Rotation of the connecting element 12 now will of course increase the tension of the guy wire until the same is tightened up to the desired degree, and when this has been accomplished the sleeve 20 can be slid forwardly from the position shown in Fig. 1 to the position shown in Fig. 2, thus bringing the sleeve over the squared shank 15 to permit of securing the wire 22 in position to pass through the apertures 16 and 21, as shown in Fig. 3. Thus the turnbuckle will be secured so that accidental rotation thereof will be prevented, and it will of course be understood that the squared shank formation on one head end of one of the screw rods may be duplicated on the other screw rod, if desired, depending entirely upon the particular use to which the turnbuckle is to be put.

I claim:

1. In a turnbuckle the combination with a screw rod and a connecting element having the screw threaded thereto, said connecting element including a squared portion, of a head on the screw rod and having a squared shank, and a squared sleeve mounted to slide on the squared portion of the connecting element, and movable to extend over and around the squared shank of the head to lock said head relative to said connecting element.

2. In a turnbuckle the combination with a connecting element having a squared portion, of a screw rod threaded into the connecting element, a head on the screw rod, a squared shank on said head and provided with an aperture, an apertured square sleeve mounted to slide on the squared portion of said connecting element, and movable to extend over and on to the squared shank of the head, with the apertures of the sleeve in registration with the aperture in the shank of the head, and a locking element adapted to pass through said registering apertures to lock said sleeve relative to the shank of the head.

3. In a turnbuckle the combination with a connecting element having the surface thereof of a particular shape, of a screw rod in threaded engagement with said element, a head on said screw rod, a shank integral with said head and having the exterior of the same contour as the exterior of said connecting element, a sleeve mounted to slide on said connecting element and having its inner surface of a shape and contour similar to the shape and contour of the surface of said connecting element and said shank, said sleeve being movable to extend over and on to said shank, and means for locking said sleeve relative to said shank, when said sleeve has a portion thereof extending on to and over the shank and another portion thereof extending on to and over a part of said connecting element.

In testimony whereof I affix my signature.

CARL HINDERMAN.